J. A. WOOD.
HARROW ATTACHMENT FOR WHEEL PLOWS.
No. 245,424. Patented Aug. 9, 1881.
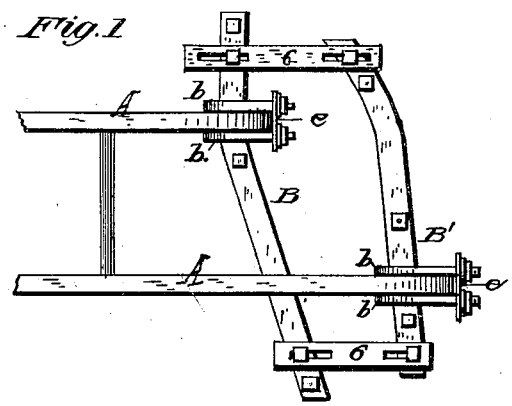
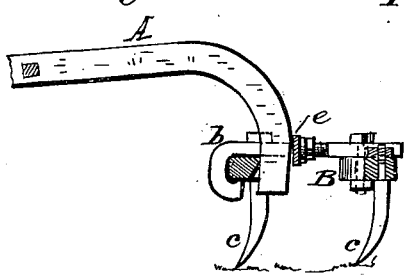
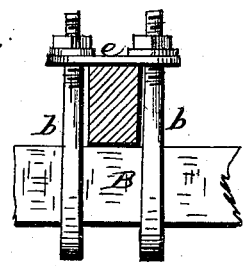
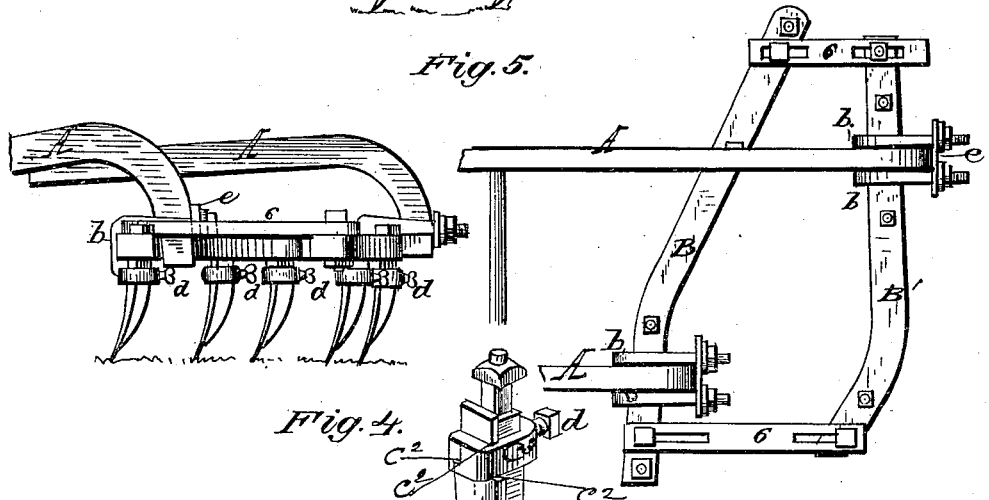
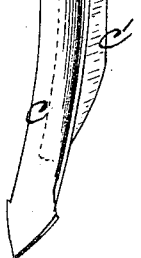
Witnesses
Fred G. Dietrich
Bertha L. Dietrich
Inventor
James A. Wood
by W. H. Goddard
Attorney

UNITED STATES PATENT OFFICE.

JAMES A. WOOD, OF GREENSBURG, INDIANA.

HARROW ATTACHMENT FOR WHEEL-PLOWS.

SPECIFICATION forming part of Letters Patent No. 245,424, dated August 9, 1881.

Application filed December 22, 1879.

*To all whom it may concern:*

Be it known that I, JAMES A. WOOD, of Greensburg, in the county of Decatur and State of Indiana, have invented certain new and useful Improvements in Harrow Attachments for Wheel-Plows; and I do hereby declare the following to be a full, clear, and exact description of the invention, such as will enable others skilled in the art to which it appertains to make and use the same, reference being had to the accompanying drawings, and to letters of reference marked thereon, which form a part of this specification, and in which—

Figure 1 is a plan view, partly broken away, of my improved harrow attachment for plows; and Figs. 2, 3, 4, and 5 are detail views of my harrow attachment.

This invention relates to improvements upon a patent issued to me July 30, 1878, No. 206,409; and it consists of the combination and arrangement of parts composing the same, as hereinafter described, and particularly pointed out in the claim.

In the accompanying drawings, A A mark the beams, with their downwardly-curved ends adjusted—one to the rear side of bar B' of the harrow-frame and the other to the same side of the bar B of the said frame—in an oblique plane to each other, to bring the draft equally upon the harrow-frame. Regardless of the shape of the beams, the fastening herein provided is adapted to secure them to the harrow-frame. This fastening consists of hooked bolts $b$, with their hooks fitted against the front sides of the longitudinal bars of the harrow-frame, and extended under the same, and their rearwardly-projecting ends screw-threaded and passed through a plate, $e$, clamped thereon, and against the downwardly-curved ends of the beams A by nuts adjusted upon said ends of the bolts. This construction and arrangement also allows the beams to be adjusted laterally upon the harrow-frame as occasion may require.

The curved longitudinal bars B B' are connected together by end bars, 6 6, with slots in them, through which screw-bolts are inserted, entering the bars B B', to permit the relative adjustment of the bars B B', to allow the teeth or shovels of each bar to be brought nearer together or placed farther apart.

$c$ are the shovels, one being adjusted at each of a suitable number of intervals apart on the bars B B' of the harrow-frame.

$c'$ are the shovel-standards, extending down against the rear sides of the shovels or teeth, with their upper ends bolted to the bars B B', while the shovels or teeth are recessed or slotted on each side at their upper ends, as at $c^2$, and confined to the standards $c'$ by sleeves $c^3$, provided with set or adjusting screws $a$. The shovels or teeth are inserted into the sleeves $c^3$ before placing them upon the standards $c'$ sidewise with the length of the apertures in the sleeves $c^3$, so as to fit the sleeves into the slots $c^2$ of the shovels or teeth. The front surface of the points of the shovels or teeth is beveled off to taper rearwardly to a flat surface on said side of the point to cause it, as it wears, to retain its cutting-edge.

This invention is designed as an improvement upon the patent granted to me July 30, 1878, No. 206,409, the essential features of which are the curved arms, the slotted side bars, 6, the securing-clamps $b\ e$, and the tooth-clamp $c^3\ d$, in combination.

I am aware that shovels have been secured removably to shanks by loops and wedges, as seen in Patent No. 64,370, of April 30, 1867. I am also aware that removable shovels have been secured to the cross-bars of the frame by clamp and screw; but this construction is apt to allow vertical displacement, as shown in Patent No. 86,750, of 1869. I am also aware that shovels have been secured to the shanks by a bolt passing directly through each, as seen in Patent No. 109,247, 1870; but this construction weakens the parts. I am also aware that shank and shovel in one or secured together and not removable is old, as shown in Patent No. 35,434, of 1862, and none of these constructions are sought to be covered in this application.

I place importance upon the peculiarly curved arms and slotted side bars as being new in the art and an improvement upon my patent hereinbefore mentioned. I place importance upon the removable shovels and the hooked clamp $c^3\ d$, and also upon the double clamp $b\ e$. I place importance upon the adjustability of the bars B B'.

What I claim as new is—

In a harrow, the combination of the differentially-curved bars B B', the slotted side bars, 6, allowing a forward and backward adjustability to said bars B B', the curved beams A, one secured to the adjustable bar B and the other to the adjustable bar B', by means of two hooked adjustable clamps, $b\ b$, and plate $e$, as shown and described.

In testimony that I claim the foregoing, I have hereunto set my hand this 21st day of November, 1879.

JAMES A. WOOD.

Witnesses:
 JOHN A. WOOD,
 CHRIS. SHANE.